No. 694,264. Patented Feb. 25, 1902.
A. GIBBS.
UTILIZING POWER IN VELOCIPEDES.
(Application filed June 15, 1900.)

(No Model.) 6 Sheets—Sheet 1.

WITNESSES: INVENTOR:

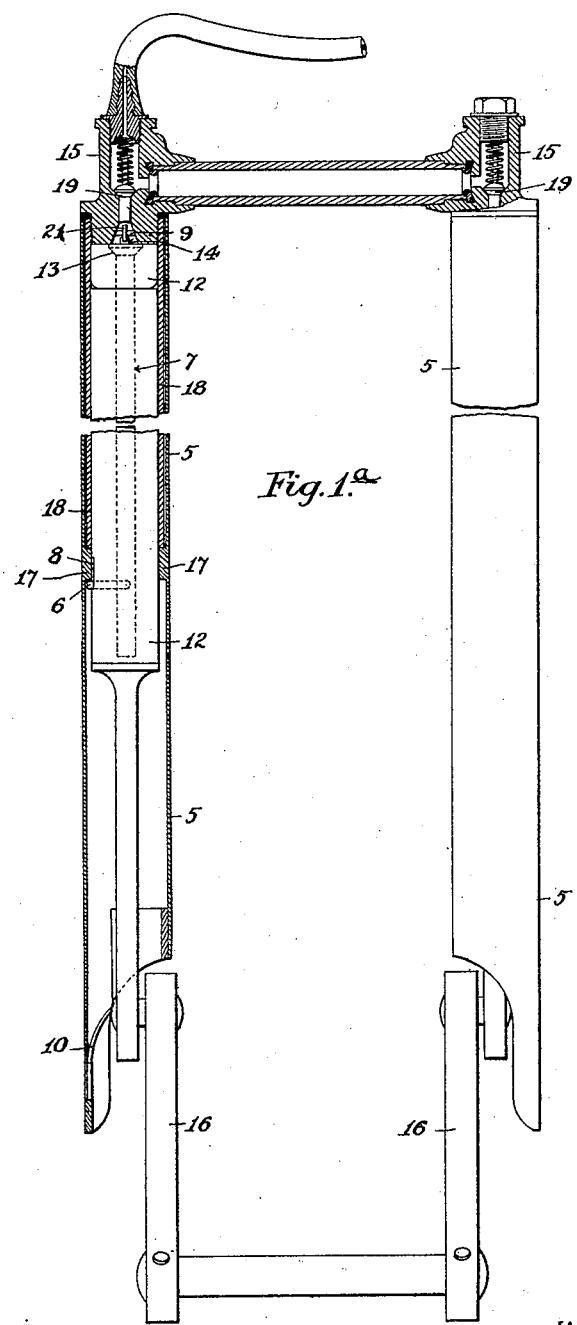

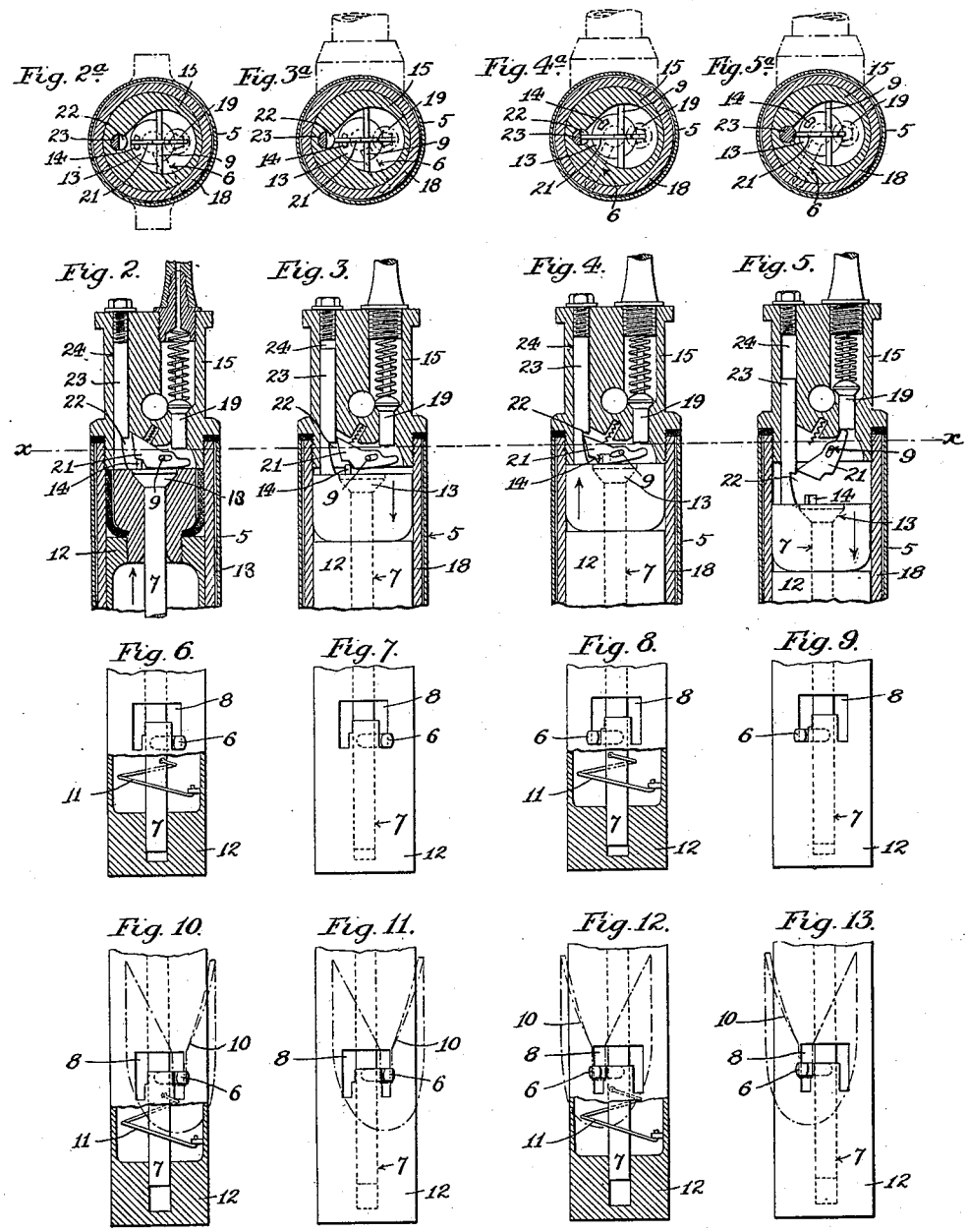

No. 694,264. Patented Feb. 25, 1902.
A. GIBBS.
UTILIZING POWER IN VELOCIPEDES.
(Application filed June 15, 1900.)

(No Model.) 6 Sheets—Sheet 4.

WITNESSES
S. M. McColl.
E. J. W. Clarkson

INVENTOR
Antony Gibbs
By F. C. Somes
Attorney

No. 694,264. Patented Feb. 25, 1902.
A. GIBBS.
UTILIZING POWER IN VELOCIPEDES.
(Application filed June 15, 1900.)

(No Model.) 6 Sheets—Sheet 5.

WITNESSES
INVENTOR

No. 694,264. Patented Feb. 25, 1902.
A. GIBBS.
UTILIZING POWER IN VELOCIPEDES.
(Application filed June 15, 1900.)
(No Model.) 6 Sheets—Sheet 6.
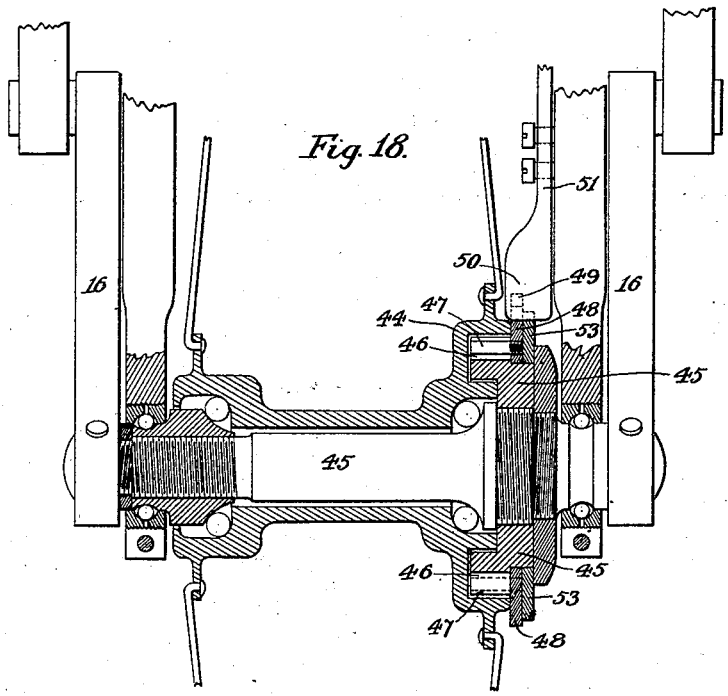
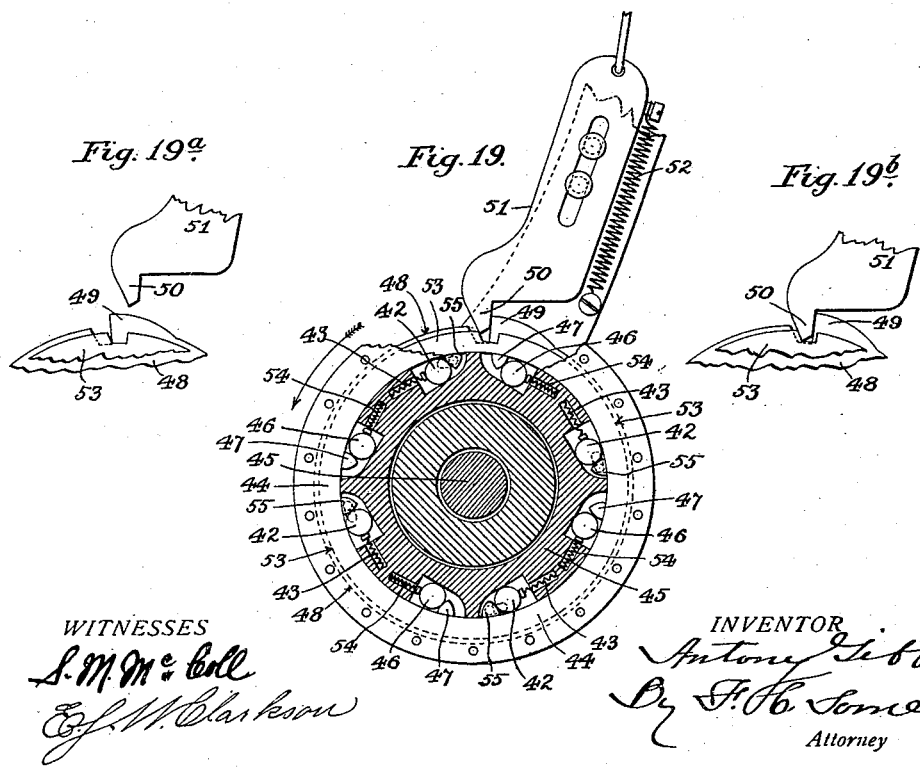
WITNESSES
INVENTOR
Attorney

UNITED STATES PATENT OFFICE.

ANTONY GIBBS, OF BRISTOL, ENGLAND.

UTILIZING POWER IN VELOCIPEDES.

SPECIFICATION forming part of Letters Patent No. 694,264, dated February 25, 1902.

Application filed June 15, 1900. Serial No. 20,461. (No model.)

*To all whom it may concern:*

Be it known that I, ANTONY GIBBS, a subject of the Queen of Great Britain, residing at Tyntesfield, Bristol, in the county of Somerset, England, have invented new and useful Improvements Relating to Storing Up and Utilizing Power in Velocipedes and other Vehicles, (for which I have made application for patent in Great Britain, bearing No. 23,017, dated November 18, 1899,) of which the following is a specification.

The idea of a velocipede which downhill shall store up power by compressing air, which power shall be used uphill, has occurred to a number of inventors. Nevertheless there does not exist anything which might fairly be called a practical realization of the idea. The probable reason is that several equally important parts complementary to each other must be actuated by the very simplest means. The air-pressure, which is naturally unequal in the magazine, has automatically to regulate itself to a definite and at the same time adjustable degree. The pump must, moreover, be capable of being easily put into or out of action.

The present invention relates to a special construction and combination of parts which permit of the realization of the object above referred to, and it comprises: (a) a special construction of reversible or convertible pump and motor, (b) means for regulating the air-pressure, and (c) means for engaging the hub of the wheel of the vehicle with such reversible pump or for completely releasing the latter from such hub.

Figure 1:
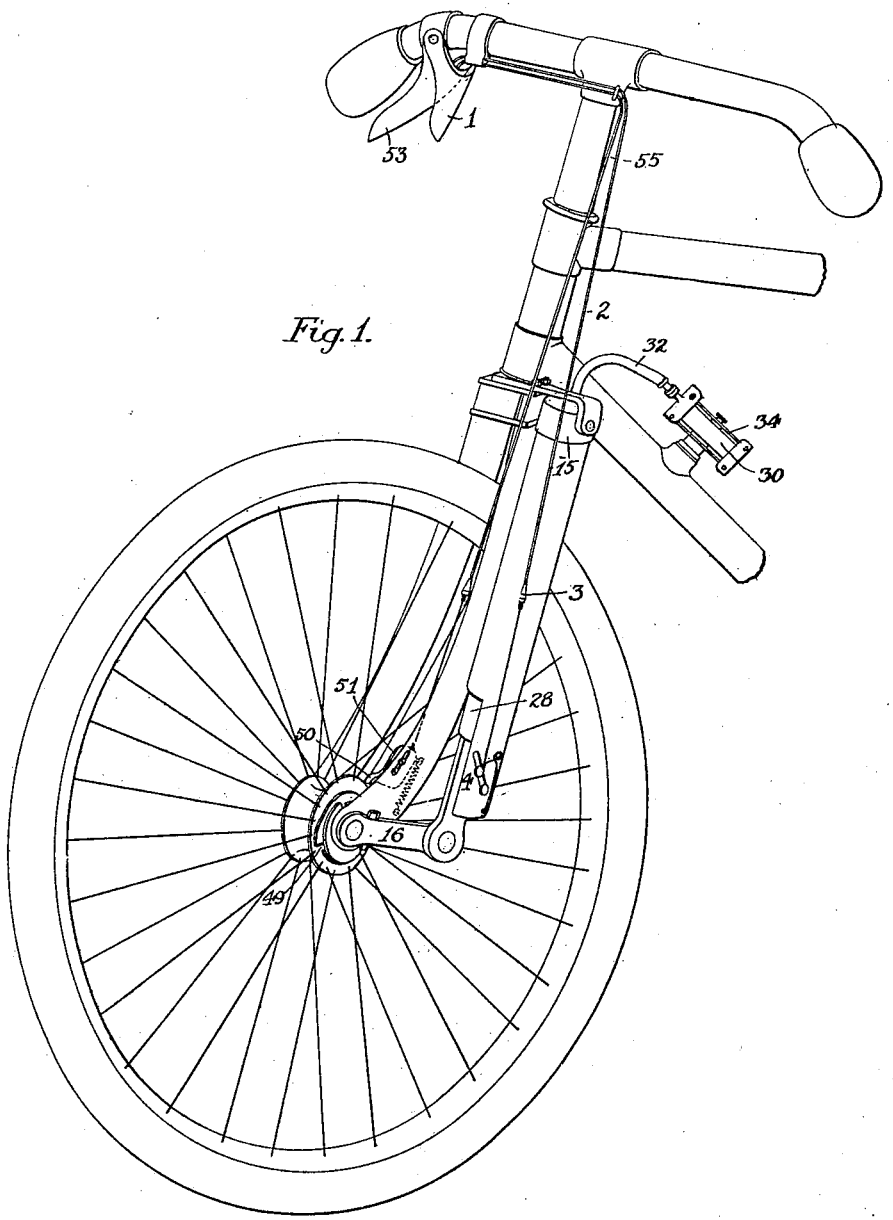
Figure 14:
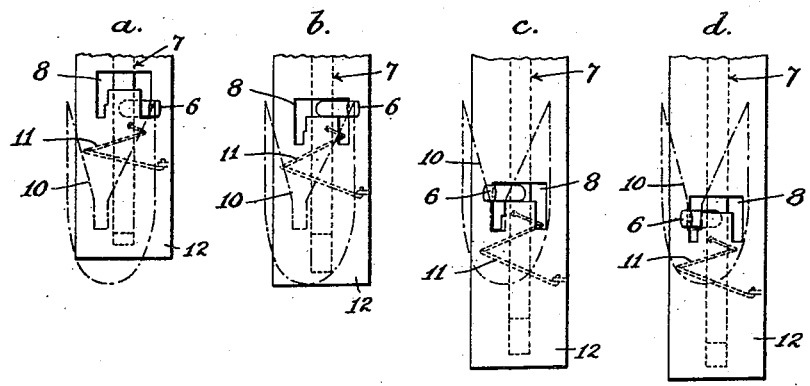
Figure 15:
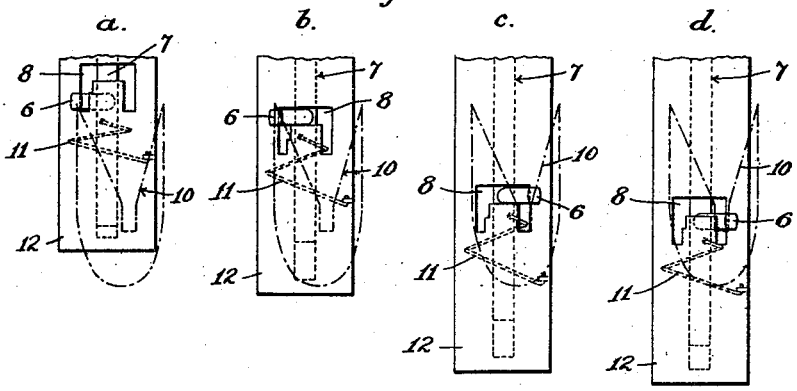
Figure 16:
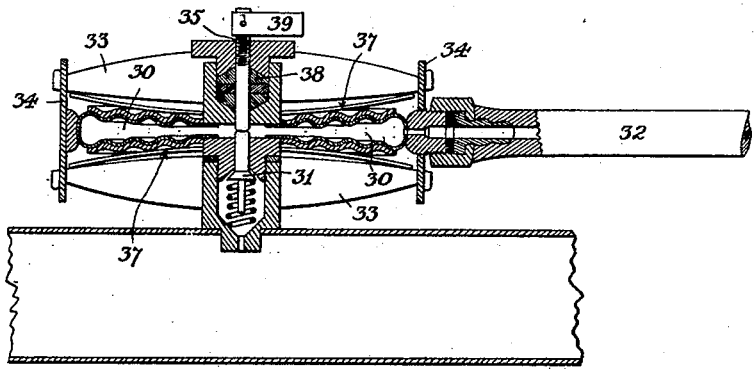

In the accompanying drawings, Figure 1 represents a perspective view of part of a bicycle with my invention applied thereto. Fig. $1^a$ represents an elevation, partly in section, of a pair of reversible pumps constructed in accordance with my invention, such pair of pumps being connected together in the manner I prefer to employ. Figs. 2, 3, 4, and 5 are vertical sections through the head of a pump and show the valves and other operating parts in different positions. Fig. $2^a$ is a cross-section on line $xx$ through the pump-head corresponding to Fig. 2 and shows the pump provided with a pair of trunnions by which (when a single pump is employed) same is mounted on the bicycle or other velocipede. Figs. $3^a$, $4^a$, and $5^a$ are similar views corresponding to Figs. 3, 4, and 5, respectively, but show the pump-head provided with the connection to a second pump, as illustrated in Fig. 1. Figs. 6, 7, 8, and 9 are views of the lower end of the hollow piston, the parts being in the positions they occupy when such piston is at the top of its stroke; and Figs. 10, 11, 12, and 13 are similar views of same with the parts in the positions they occupy when the piston is at the bottom of its stroke. Figs. 2, $2^a$, 3, $3^a$, 6, 7, 10, and 11 show the parts in the "pumping" position which they occupy when air is being pumped into the magazine, while Figs. 4, $4^a$, 5, $5^a$, 8, 9, 12, and 13 show such parts in the "power" position—that is, when air from the magazine is being used to assist the rider. Fig. 14 represents the operation of changing the parts from the pumping to the power position, while Fig. 15 represents the operation of changing from the power to the pumping position. Fig. 16 is a vertical section, and Fig. 17 a plan view, of the means I employ for regulating the air-pressure. Fig. 18 is a vertical section of the arrangement for engaging the hub of the wheel of the vehicle with the reversible pump or for completely releasing the latter from such hub. Fig. 19 is a vertical section of same, taken at right angles to Fig. 18, and Figs. $19^a$ and $19^b$ are detail views of parts of such arrangement.

According to this invention the rider has only to lift one or the other of two spoon-shaped levers which are situated underneath the handle-bar within easy reach of the fingers in order to connect the pump so as to allow same to act either as a pump or as a motor. One of the levers is somewhat longer than the other, and in being lifted the wheel to which the reversible pump is fitted from being a free wheel becomes coupled with the pump-crank and compression of air takes place. On releasing the lever the pump is put out of action and the wheel becomes free again. On actuating the second lever on account of its being adjusted under the first lever the latter is lifted as well, and when in this manner they are both lifted the pump from a compressor becomes a motor and remains a motor as long as the levers remain lifted. The power exerted by the hand is very small and causes no fatigue. On releasing both levers the motor is put out of action and the wheel becomes free again. Such simplicity of management would be out of the question in any system based on sliding valves, such as used in steam-engines. It is a noteworthy feature of this invention that all air-passages remain the same both for pumping and power purposes without any displacement of such passages. To this circumstance, at least partly, the simplicity of action of the apparatus is due.

Referring now to the special construction of the pump, it will be seen that Figs. 1 to 5ª, inclusive, show at 5 a sleeve which is capable of a partial rotation round cylinder 18. Fig. 1ª shows that this sleeve extends below the stroke distance of piston 12. Fig. 2ª shows the upper part of cylinder 18 ending in a headpiece with two pivots, which latter (suitably supported) form the fulcrum for the oscillating movement of the pump. Fig. 1ª shows a double pump and in this case the tube connecting the two pumps forms the fulcrum for the oscillating motion. This double arrangement only serves purposes of symmetry and discloses no invention, as both pumps act together in the same way. Their construction, mode of reversal, &c., are precisely alike to the smallest detail.
Fig. 1ª shows the hollow piston 12 with its solid extension, which latter is connected to crank 16 in the usual way. The lower end of the hollow piston 12 is formed with a central hole which serves as a guide to the valve-spindle 7. This valve-rod extends the whole length of the hollow piston and carries on its upper extremity the piston-valve 13, which is preferably of conical form. To the lower part of valve-spindle 7 a spiral spring 11 is attached in such a manner that, on the one hand, it always tends to close valve 13, and, on the other hand, it always tends to turn the valve-spindle 7 toward one side, (the right-hand side of the drawing.) Near its lower end and at right angles to its length the valve-spindle 7 carries a guide-pin 6, which projects out of an opening 8, which is cut into the hollow body of the piston 12 and has the form of an inverted U—a right and a left limb joined together on the top. From what has been said of the action of spiral spring 11 it follows that guide-pin 6 is normally held in the right-hand limb of opening 8 and is always drawn to the bottom of it. The guide-pin 6 projects out of the hollow piston to approximately the extent of the thickness of the cylinder 18; but the opening 8, with the guide-pin 6, never enters the cylinder, but remains below it. (See Fig. 1ª.) The guide-pin 6 therefore projects into the annular space between the piston 12 and the sleeve 5. The lower part of this annular space is provided with a portion of a tube which may be formed with the sleeve 5 and constitutes, as it were, its inner lining. For the purpose of operating on guide-pin 6, as hereinafter described, the portion of tubing is cut away, so that its edges form a diagonal cutting 10, wide at the top and narrowing downward toward the center and forming a recess just wide enough to receive guide-pin 6, as shown in broken lines in Figs. 10 to 15, inclusive.

It has been stated above that guide-pin 6 is normally drawn to the bottom of the right-hand limb of the U-shaped opening 8; but it does not remain there to the end of the downstroke, as just before the piston arrives at the end of its downstroke guide-pin 6 abuts against the bottom of the recess of diagonal cutting 10, so that as the piston proceeds farther the guide-pin 6 is lifted up, as shown in Figs. 10 to 13, inclusive. Figs. 10 and 11 show guide-pin 6 in the right-hand limb of 8, (which is the pumping position.) The valve 13 is of course open, and should the suction action of the piston during its outward stroke not have been sufficient to keep the valve 13 open to the end of that stroke the forcible lifting of 13 in the manner just described will enable the cylinder to be entirely filled with air. As the piston now moves inward guide-pin 6 leaves the recess of diagonal cutting 10, falls to the end of the limb of 8, and shuts valve 13, thereby securing a full body of air being above the piston for compression, which air at the end of the inward stroke forces open the valve 19, Fig. 1ª, and escapes into the reservoir, which may be constituted by the framing of the machine or may be a special reservoir.

Where the piston works as a motor-piston the following further parts come into consideration. The pump-head 15 is in the direction of its length furnished with a hole 24, Figs. 2 to 5, inclusive, in which a rod 23 moves in and out. This rod is eccentrically fixed to the piston, as shown in the drawings. The piston is by means of the crank 16, Fig. 1ª, prevented from turning and rod 23 is always enabled to pass freely into hole 24. Figs. 2 to 5ª, inclusive, show a doubled-armed lever 21, which has pin 9 for its fulcrum. The left arm of lever 21 can enter into a notch 22, cut into the rod 23, while the right arm is in touch with valve 19, which latter it can lift when on the outward motion of the piston (which now works as a motor) the left arm of lever 21 is depressed. This position is shown in Figs. 5 and 5ª. Compressed air now acts on the face of the piston and this will go on till the end of rod 23 has passed the left-hand lever-arm, after which lever 21 falls back into its natural horizontal position and the valve 19 closes. It is clear, therefore, that the length of the rod 23 determines during what proportion of the whole stroke the full air-pressure shall be able to act on the piston. When on the inward stroke of the piston rod 23 again enters hole 24, it slightly lifts the left arm of the lever against the pressure of a small spiral spring which is let into the body of the pump-head, as shown in the drawings. Its object is when the lever-arm comes opposite the notch of rod 23 to push such arm into it, as shown in Figs. 4 and 4ᵃ. As the piston proceeds downward and near the end of its stroke the guide-pin 6 (which now is in the left-hand limb of the U-shaped opening 8) strikes the bottom of the recess 10. The valve 13 is thus lifted and the air inside the cylinder is brought into communication with the outer air, so that any difference in pressure will now adjust itself; but it is necessary that valve 13 shall remain open during the inward stroke of the piston, as otherwise it would compress the air in front of it. For this purpose the edge of the limb of the U-shaped opening against which guide-pin 6 is pressed by spiral spring 11 is not left straight, but is somewhat wider at the top than at the bottom. Into the shoulder thus formed the guide-pin 6 is pushed at the end of the stroke of the piston and held there by the power of the spiral spring, (which, having a longitudinal as well as a circular motion, acts diagonally.) Thus valve 13 remains open till nearly the end of the inward stroke, when the face of the valve 13 comes into contact with the under surface of the pump-head 15 or when guide-pin 6 comes into contact with a ring 17, Fig. 1ᵃ. The consequence of this is that the valve is forced into its seat and guide-pin 6 enters the narrow part of the limb. This play is constantly going on so long as the piston works as a motor.

Suitable means are provided for changing the operation of the apparatus from a pumping action to a motor action and the reverse. For this purpose the valve 13 is provided with means for engaging the lever 21 and holding said lever out of action when the device is acting as a pump and permitting it to engage and open the valve 19 when the device is acting as a motor. The specific means herein shown for this purpose will now be described. The face of the conical valve 13 is provided on its circumference with a projection 14, Figs. 1ᵃ to 5ᵃ, inclusive, for which a recess is cut out of the body of the pump-head, into which it can enter. In this recess the lever 21 is also arranged. The latter is provided with a short inclined plane, as seen in Figs. 2 to 5, inclusive, and when projection 14 comes into contact with this inclined plane the lever is pushed away from rod 23, for which purpose the hole in the lever is elongated. In this position, Figs. 2 and 3, it is impossible for the notch 22 in rod 23 to engage the lever 21. In the normal or pumping position of the spindle 7 the lug 14 on the valve 13 engages the lever 21 and prevents its left arm from engaging the notch 22 of the rod 23 on the piston. On turning the spindle into the motor position the lug 14 escapes the lever 21 and the spiral spring 21' forces the left arm of said lever into engagement with the notch 22 of the rod 23, whereby on the outstroke of the piston the left arm of said lever 21 is depressed and the right arm raised into contact with the valve 19, forcing said valve open and permitting the compressed air from the reservoir to escape into the cylinder and operate the piston, causing the pump to act as a motor for driving the wheel. This is the natural position of the valve-spindle 7, in which pumping takes place and into which it is always forced by spiral spring 11. This explains why pumping takes place at once as soon as the wheel is coupled with the crank 16, Fig. 1ᵃ. This is brought about by actuating the first of the two levers under the handle-bar, to which reference was made at the beginning of this specification. It was also stated that by moving both levers the reversible pump was caused to act as a motor. This is brought about through the second lever being connected by suitable means with the sleeve 5, which, it will be remembered, is capable of partially rotating round the cylinder 18. In being thus moved the diagonally shaped inner lining 10 of the sleeve takes up different relative positions to guide-pin 6, and therefore acts on the latter to cause same to occupy either limb of the U-shaped opening 8, as desired. Fig. 14 shows how the pin 6 is moved from the right limb of opening 8 to the left limb. In position $a$ the guide-pin 6 just touches the slanting edge of 10. In position $b$ pin 6 has been lifted up to the horizontal part of 8. In position $c$ the center recess of 10 is shown to correspond with the left limb of 8, and position $d$ shows that spiral spring 11 has moved pin 6 into the small recess or corner cut into the inner edge of the left limb of 8. This is the power or motor position of the reversible pump. In Fig. 15 guide-pin 6 is shifted from left to right in a reverse manner. The action is best realized when it is borne in mind that any intended change on the part of the rider only takes effect when the piston is near the end of the downstroke. It should also be remembered that when the piston arrives at the end of the upstroke the guide-pin 6 must be in either of the limbs of U-shaped opening 8. It can never remain in the passage connecting the two limbs, inasmuch as if it has been lifted into such passage directly it is free from the influence of cutting 10 the spiral spring 11 always moves it to the right and downward into the limb. The sleeve 5 is moved by the action of the second lever under the handle-bar against a spring which will always tend to bring it back again to the home position. There are various ways of effecting suitable connection between the second lever on the handle-bar and the sleeve. This translation of one motion to the other does not amount to invention proper and may reasonably be left to the fancy of the individual constructor.

Figure 17:
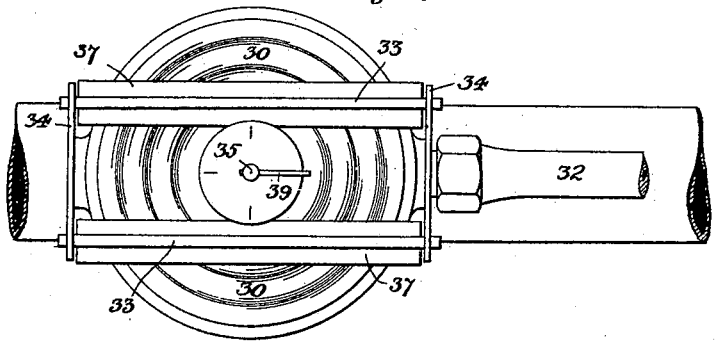

The means I employ for regulating the air-pressure are illustrated in Figs. 16 and 17, in which it will be seen that for this purpose I introduce between the pump and the main reservoir (which may, as hereinbefore stated, consist in the metal tubing constituting the frame of the vehicle, as shown in these Figs. 16 and 17, or may be a separate reservoir suitably mounted upon such frame) a metal box 30, with corrugated elastic sides, such as are used with aneroid barometers, as shown in the drawings. Such metal box is surrounded by a frame formed by bars 33 and links 34. The elastic force is augmented by springs 37, between which and the bars 33 is room for the sides of the box to expand in. The top of the box is furnished with a stuffing-box, through which passes a screw 35, rendered air-tight by the packing 38. The bottom carries a hollow plug containing the valve 31 and which communicates with the main reservoir. In the collapsed state of the box 30 screw 35 presses on the valve 31 and keeps it open. By increasing the pressure the box widens out till screw 35 leaves the valve 31, when the latter will close up against any pressure from the main reservoir. While the latter continues to be fed by the pump, the box is prevented by its surrounding frame from expanding any further. When now the pump is using air, same then passes through 32 in the reverse way into the pump, the box 30 collapses, and after the first pulsation no more than a determinate quantity of air can ever act on the piston, the pressure being always the same and equal to that of the box and its springs. By introducing screw 35 farther into the box the quantity of air is increased, inasmuch as now the sides have to widen out more before screw 35 leaves the valve. A movable indicator working over a scale outside the stuffing-box secures any desired pressure.

If the intermediary box is applied to a velocipede, the rider is enabled by these means to regulate the rate at which his stored-up air will be used, and if the pump-motor is arranged, as hereinbefore described, so that during a certain portion only of the piston-stroke the full pressure acts on the piston the pressure in box 30 can by means of screw 35 be regulated, so that under normal conditions the expenditure of power takes place under the most economical conditions.

The arrangement for engaging the hub of the wheel with the reversible pump attached to the vehicle or completely releasing the same from such hub is illustrated in Figs. 18, 19, 19ª, and 19ᵇ of the drawings.

It will be seen that I use a coupling-hub half the rollers of which have their recesses cut in the opposite direction to that of the other half. The necessity for this becomes clear on considering that the wheel running always in the same direction and sometimes driving the hub and sometimes being driven by the latter recesses cut in one direction only would not serve both purposes.

The double-acting coupling or clutch is shown in Figs. 18 and 19 of the accompanying drawings, where two sets of rollers, one for pumping and one for power purposes, are shown. The four rollers marked 42 are for power purposes and are pressed by springs 43 toward their working position in the narrow part of the recesses.

The arrow outside the wheel-casing 44 shows the direction in which the wheel turns, and it will be seen that this casing 44 of the hub 45 acts on rollers 42 in such a manner that the springs 43 will be compressed, with the result that the rollers will be forced into the wide part of the recesses; but when by means of crank 16, Fig. 18, power acts on the hub the rollers 42 are moved into the narrow part of the recesses, where they engage the hub with the casing 44. The four rollers marked 46, with their springs 54, serve when the hub actuates crank 16 for pumping, and casing 44 moves these rollers into the narrow part of the recesses. In the drawing they are depicted as held back in the wide part of the recesses by the four pins marked 47. These four pins 47 are fixed to the disk 48, which has on its circumference a projection 49, against which abuts the nose 50 of a movable piece 51, which ordinarily is forced toward projection 49 by a spring 52.

When the rider lifts the first of the two levers hereinbefore referred to under the handle-bar, which lever may be attached to the movable piece 51 by a wire, such movable piece 51 is lifted away from 49, with the result that disk 48, with its pins 47, returns to the position from which it was moved by 50 coming into contact with 49, and the hub and casing are immediately coupled together. On letting go of the lever the rider gets a free wheel on 49 coming in contact with the nose 50.

So far as it is now described the free wheel is still subjected to a small friction, which is caused by the rollers 42 against their springs 43. In order to have a perfectly free wheel, a second disk 53 is provided and has four pins 55, which are situated between those fixed to disk 48. The pins 55 pass through holes drilled through the neighboring disk 48, which holes are large enough to permit a small angular displacement to take place between the disks. The latter are pressed by the spiral springs in opposite directions, and at the place where the nose 50 in its descent touches disk 53 there is a recess formed in the latter. When the nose 50 touches projection 49, the disk 48 is displaced, and this produces an opening next to the recess in disk 53, into which the wedge-like extremity of 50 enters, and by doing so slightly moves disk 53 against its springs sufficiently to prevent any further contact between casing 44 and rollers 42. In other words, when nose 50 is fairly pushed between the two disks all the rollers are forced into the wide part of the recesses and the wheel is completely free.

Fig. 19 with the two other figures 19ª and 19ᵇ show three positions of the parts just referred to. In the first position nose 50 is moved away from projection 49, and the hub 45 is coupled with casing 44. In the second position the disk 48 has been displaced by nose 50; but the wedge-like extremity of such nose has not yet entered the opening in disk 53, as, however, is shown in the third position, which also indicates the displacement of such disk 53.

I claim as my invention—

1. A pump adapted to act either as a motor or a compressor, comprising a cylinder, a valve in said cylinder, a piston, a valve and valve-spindle in said piston, and means for turning said spindle in opposite directions whereby the pump is changed from a compressor to a motor or the reverse.

2. A pump adapted to act either as a compressor or a motor comprising a cylinder, a valve in said cylinder, a piston in said cylinder, a valve and valve-spindle in said piston, means for turning said spindle in opposite directions, and means connected with said piston for opening the cylinder-valve when the spindle is turned in one direction thereby causing the pump to act as a motor.

3. A pump adapted to act either as a motor or a compressor, comprising a cylinder, a valve in said cylinder, a piston in said cylinder, a valve and valve-spindle in said piston, means for turning said spindle in opposite directions, means connected with the piston for opening the cylinder-valve when the spindle is turned in one direction, and means connected with the piston-valve for preventing the cylinder-valve from being opened on the outstroke of the piston when the spindle is turned in the opposite direction.

4. A pump adapted to act either as a compressor or a motor, comprising a cylinder, a valve in said cylinder, a piston in said cylinder, a valve and valve-spindle in said piston, means for turning said spindle in opposite directions, a lever fulcrumed in a recess in the head of said cylinder, a notched rod connected to said piston and adapted to engage said lever on the outstroke of the piston thereby causing the lever to engage the cylinder-valve and hold it open for a predetermined period when the pump acts as a motor.

5. In a convertible pump and motor, the combination of an air-reservoir, a cylinder, a hollow piston disposed therein and having a slotted opening, a valve-spindle disposed in said piston and provided with a valve on its upper end, a spiral spring attached at one end to said spindle and at the other end to said piston for holding said valve normally in closed position, a guide-pin extending at right angles from said valve-spindle and projecting through the opening in the piston, a rotatable sleeve surrounding said cylinder and provided at its lower end with a V-shaped slot adapted to engage said guide-pin and change the position thereof in the slot of the piston thereby adapting the pump to be used either as a motor or a compressor.

6. In a convertible pump and motor, the combination of an air-reservoir, a cylinder, a hollow piston disposed therein and having a slotted opening, a valve-spindle disposed in said piston and provided with a valve on its upper end, a spiral spring attached at one end to said spindle and at the other end to said piston for holding said valve normally in closed position, a guide-pin extending at right angles from said valve-spindle and projecting through the opening in the piston, a rotatable sleeve surrounding said cylinder and provided with means for engaging said guide-pin to change the position thereof, whereby the pump may be used either as a motor or a compressor, and means for rotating said sleeve in opposite directions.

7. In a convertible pump and motor, the combination of a cylinder, a hollow piston disposed in said cylinder and having an inverted-U-shaped opening therein, a valve-spindle disposed in said piston and provided with a guide-pin adapted to extend through said U-shaped opening, means for normally turning said spindle toward the right and holding the guide-pin normally in the right limb of said opening whereby the pump acts as a compressor, and means for moving said guide-pin into the left limb of the opening whereby the pump acts as a motor.

8. In a convertible pump and motor, the combination of a cylinder, a piston disposed in said cylinder and having a two-limbed opening therein, a valve-spindle disposed in said piston and provided with a guide-pin adapted to project through said opening, means for turning said spindle in one direction whereby the pump may be used as a motor, and means for turning said spindle in the opposite direction whereby the pump may be used as a compressor.

9. In a convertible pump and motor, the combination of an air-reservoir, a cylinder, a piston disposed in said cylinder, a valve-spindle disposed in said piston and provided with a valve at its upper end, a pump-head having a vertical channel therein, a notched rod fixed to said piston and adapted to move in said channel, a valve-chamber provided with a valve disposed in said head and connected with said reservoir, a two-armed lever fulcrumed near its center, one arm of which is adapted to engage the notch of said rod and the other arm the valve in said head, and means for actuating the piston.

10. In a convertible pump and motor, the combination of a pump-head having a valve therein, a cylinder, a piston, a rod fixed to said piston and having a notch therein, and a double-armed lever fulcrumed in said head, one arm thereof being adapted to engage the notch in said rod whereby said arm is depressed on the forward stroke of the piston and the other arm raised into contact with the valve in the head thereby opening the valve for the admission of air to actuate the piston.

11. The combination of a vehicle, a main driving mechanism mounted thereon and connected with the driving-axle thereof, an auxiliary driving mechanism also mounted on said vehicle and comprising a convertible pump-motor and detachable means positively connecting the piston of said pump-motor to said driving-axle.

12. The combination of a vehicle-frame, a loose axle journaled therein, a crank on said axle, a pump connected with said crank, and a clutch mechanism for uniting the wheel and axle.

13. The combination of a vehicle-frame, a loose axle journaled therein, a crank on said axle, a pump connected with said crank, an air-reservoir connected with said pump, a clutch mechanism for uniting the wheel and axle, and means for shifting the clutch mechanism in either direction to unite or release the axle.

14. The combination of a vehicle-frame, a loose axle journaled therein, a crank on said axle, a pump connected with said crank, an air-reservoir connected with said pump, a clutch mechanism for uniting the wheel and axle, means for shifting the clutch mechanism in either direction to unite or release the axle, and means for shifting a part of the pump to change it from a pump to a motor and the reverse.

15. The combination of a vehicle-frame, a loose axle journaled therein, a crank on said axle, a pump connected with said crank, a hub disposed loosely on said axle and provided with recesses of different shape alternating with each other, rollers disposed in said recesses, disks connected with said hub, and means for causing an annular displacement of said disks whereby the rollers are moved out of contact with said hub and a free wheel obtained.

16. The combination of a vehicle-frame, a loose axle journaled therein, a crank on said axle, a pump connected with said crank, a hub disposed loosely on said axle and provided with recesses of different shape alternating with each other, rollers disposed in said recesses, disks connected with said hub, and a wedge-shaped nose adapted to normally engage said disks and thereby hold the rollers out of contact with the hub and release the wheel from the pump.

17. The combination of a vehicle-frame, a loose axle journaled therein, a crank on said axle, a pump connected with said crank, a hub disposed loosely on said axle and provided with recesses of different shape alternating with each other, rollers disposed in said recesses, disks connected with said hub and provided with notches, a wedge-shaped nose adapted to engage said notches and displace said disks thereby releasing the hub from the axle, and giving a free wheel.

18. The combination of a vehicle-frame, a loose axle journaled therein, a crank on said axle, a pump connected with said crank, a hub disposed loosely on said axle, a clutch member fixed on said axle, and means for causing said hub to engage said clutch member thereby uniting the hub with the axle.

19. The combination of a vehicle-frame, a loose axle journaled therein, a crank on said axle, a pump connected with said crank, a hub disposed loosely on said axle, and provided with recesses, rollers disposed in said recesses, a clutch member fixed on said axle, disks surrounding said clutch member and provided with pins extending into the recesses in said hub and adapted to normally engage said rollers, and hold them out of contact with said hub, and means for releasing said rollers from said pins causing the hub to engage the clutch member and thereby connect the hub with the pump.

20. The combination of a vehicle, a pedal-driving mechanism mounted thereon and connected with the driving-axle thereof, an auxiliary driving mechanism also mounted on said vehicle and comprising a convertible pump-motor and detachable means positively connecting the piston of said pump-motor to said driving-axle.

In testimony whereof I have signed my name to this specification in the presence of two subscribing witnessess.

ANTONY GIBBS.

Witnesses:
RICHARD A. BENNETT,
HARRY A. MCLELLAN.